United States Patent
Natarajan

(10) Patent No.: US 10,010,023 B2
(45) Date of Patent: Jul. 3, 2018

(54) SEED METERING DEVICE

(71) Applicant: Deere & Company, Moline, IL (US)

(72) Inventor: Kamalakannan Natarajan, Pune (IN)

(73) Assignee: Deere & Company, Moline, IL (US)

(*) Notice: Subject to any disclaimer, the term of this patent is extended or adjusted under 35 U.S.C. 154(b) by 22 days.

(21) Appl. No.: 15/227,062

(22) Filed: Aug. 3, 2016

(65) Prior Publication Data

US 2017/0034994 A1    Feb. 9, 2017

(30) Foreign Application Priority Data

Aug. 3, 2015 (IN) .......................... 2916/MUM/2015

(51) Int. Cl.
*A01C 7/04* (2006.01)

(52) U.S. Cl.
CPC ...................................... *A01C 7/04* (2013.01)

(58) Field of Classification Search
CPC .................................. A01C 7/04; A01C 7/128
USPC .......................... 111/183, 184; 221/254, 263
See application file for complete search history.

(56) References Cited

U.S. PATENT DOCUMENTS

| | | | |
|---|---|---|---|
| 4,023,511 A * | 5/1977 | Newman ................ | A01C 5/045 111/89 |
| 4,450,979 A * | 5/1984 | Deckler ................. | A01C 7/046 221/263 |
| 5,027,725 A * | 7/1991 | Keeton ................... | A01C 7/04 111/184 |
| 5,058,766 A * | 10/1991 | Deckler ................ | A01C 7/046 111/184 |
| 5,549,060 A * | 8/1996 | Schick .................... | A01C 7/04 111/178 |
| 5,720,233 A | 2/1998 | Lodico et al. | |
| 5,784,985 A | 7/1998 | Lodico et al. | |
| 6,758,153 B1 | 7/2004 | Hagen et al. | |
| 7,765,943 B2 | 8/2010 | Landphair et al. | |
| 8,371,239 B2 | 2/2013 | Rans et al. | |
| 8,375,873 B2 | 2/2013 | Nelson et al. | |
| 8,651,033 B2 | 2/2014 | Wollenhaupt et al. | |
| 8,850,998 B2 | 10/2014 | Garner et al. | |
| 2010/0224110 A1 | 9/2010 | Mariman | |
| 2017/0156255 A1* | 6/2017 | Haselhoff ............. | A01C 7/046 |

* cited by examiner

*Primary Examiner* — John Weiss

(57) ABSTRACT

A seed metering system comprising a housing, a seed pick-up disc with a singulating member and one or more resilient members. The housing defines a space therewith which is partitioned by a rotating seed pick-up disc. The seed pick-up disc is provided with a plurality of circumferentially spaced apart seed holding grooves. The housing accommodates seeds within a portion of the space which are picked up by the seed holding grooves during rotation of the seed pick-up disc. The singulating member cooperates with the seed pick-up disc to eliminate excess seed within each of the seed holding grooves to ensure sowing of single seed at regular intervals.

16 Claims, 8 Drawing Sheets

SEED METERING DEVICE

FIELD

The present disclosure relates to the field of precision metering for sowing seeds.

BACKGROUND

Cultivation of crops or plants requires sowing or depositing seeds with regular spacing on the location wherein the crops are required to be grown. Precisely sowing the seeds is essential considering several parameters essential for effective growth of crops which affects profitability of the farmers. Maintaining appropriate spacing between seeds ensures supply of required quantity of nutrients necessary for proper growth of the seeds into healthy crops. Further, maintaining appropriate spacing between seeds during sowing substantially reduces or entirely eliminates excessive amount of labor involved in thinning rows of crops after germination. In order to cater to proper sowing of seeds, several types of planters evolved. Planters can essentially be segregated into two distinct categories namely, pneumatic planters and mechanical planters. While mechanical planters involve mechanical arrangements for collecting seeds and depositing the seeds appropriately, the pneumatic planters utilize air for the same.

However, the presently available mechanical planters involve complex mechanisms and pose a critical problem of damaging seeds which results in the farmers incurring loss. The pneumatic planters involve complex pneumatic circuits which are difficult to maintain. In the event of malfunctioning of the pneumatic circuits, the planters fail to maintain precision during sowing. Further, the presently available planters involve high cost.

In order to provide solutions to the drawbacks of the presently available planters, there was felt a need for a device which would facilitate accurately depositing seeds.

SUMMARY

Various features, aspects and advantages will be apparent from the following detailed description when read in conjunction with the accompanying drawings wherein like numerals represent like components.

In accordance with the present disclosure there is provided a seed metering system comprising a housing, a seed pick-up disc with a singulating member and one or more resilient members.

The housing comprises a front cover and a rear cover. The housing defines an enclosed space therein forming a seed puddle area to contain seeds and a seed dispensing opening to dispense seeds from the housing.

The seed pick-up disc is disposed within the housing so as to partition the enclosed space into a seed inlet and a seed outlet. The seed pick-up disc has a plurality of seed holding grooves, circumferentially spaced apart by a predefined distance. Each of the seed holding grooves defines a seed pick-up portion, proximate the front side, and at least one seed dispensing portion, proximate the rear side. A predetermined surface is defined by the seed pick-up portion and the seed dispensing portion.

Optionally, each of the seed dispensing portions are shaped to define a first seed dispensing section and a second seed dispensing section. The first seed dispensing section is defined between the seed pick-up portion and the second seed dispensing section. The first seed dispensing section and the second seed dispensing section receive a seed therein from the seed pick-up portion. A portion of the rear side of the housing is profiled to enable conveying a seed from the second seed dispensing section to the seed puddle area. Optionally, one displacing guide is provided to displace a seed disposed between seed dispensing sections. The displacing guide facilitates ensuring dispensing a single seed from each of the second seed dispensing section to the seed dispensing opening.

At least one dispensing guide is provided displace a seed disposed within the second seed dispensing section to the first seed dispensing section. The dispensing guide facilitates ensuring dispensing a single seed from each of the first seed dispensing section to the seed dispensing opening.

A seed singulating member is associated with the seed pick-up disc for facilitating removal of excess seeds from the seed pick-up portion to leave only one seed in the seed pick-up portion. The singulating member also partitions the seed pick-up portion and the seed dispensing portion from one another along at least a portion of the seed pick-up disc. The singulating member includes a plurality of seed eliminating strips extending from at least a portion of the singulating member. The seed eliminating strips project into at least the seed pick-up portion of the seed holding grooves to facilitate eliminating excess seeds within each of the seed pick-up portions so that only one seed is present in the seed pick-up portion.

One or more resilient member is mounted on the housing. The resilient members guides the seeds into and within the seed holding grooves. The resilient members includes a first resilient strip to facilitate the seeds to be guided into the seed holding grooves from the seed puddle area. The first resilient strip has an operating plane at a first predetermined angle to the plane of the seed pick-up disc. The resilient members further include a second resilient strip to hold the seed picked up by the seed holding grooves therein. The second resilient strip is positioned at a second predetermined angle to the plane of the seed pick-up disc. The second resilient strip has a shape selected from at least one of an arcuate shape and a linear shape. The resilient members further include a third resilient strip to guide the seed from the seed pick-up portion to the seed dispensing portion of the seed holding groove. The third resilient strip has an operating plane substantially perpendicular to the plane of the seed pick-up disc. There may be one or more of the third resilient strips and each are configured to move into the seed pick-up portions of the seed holding grooves to guide seed therein into the seed dispensing portion of the seed holding grooves. The resilient members may further include a dispensing guide to facilitate ensuring dispensing a single seed from each of the at least one seed dispensing portion of the seed holding grooves to the seed dispensing opening.

In accordance with an embodiment, the resilient members may also include a dispensing guide displacing a seed disposed within said second seed dispensing sections to said first seed dispensing section, said dispensing guide further ensuring dispensing a single seed from each of said second seed dispensing sections to said seed dispensing opening.

The housing and the seed pick-up disc are made of material selected from the group consisting at least one of a metal and a polymeric material. The first resilient strip, the second resilient strip, the third resilient strip and the dispensing guide are made of at least one of a plurality of bristles and a flexible material.

BRIEF DESCRIPTION OF THE ACCOMPANYING DRAWINGS

FIG. 1 schematically illustrates a planter with the seed metering device in accordance with the present disclosure;

DETAILED DESCRIPTION

Presently available planters include a conventional seed metering device wherein, precise singulation of seeds to be disposed for cultivation is difficult to achieve in case of mechanical planters and requires pneumatic devices for precise operation thereof. This increases the cost of the planters.

The embodiments herein and the various features and advantageous details thereof are explained with reference to the non-limiting embodiments in the following description. Descriptions of well-known components and processing techniques are omitted so as to not unnecessarily obscure the embodiments herein.

Figure 1:
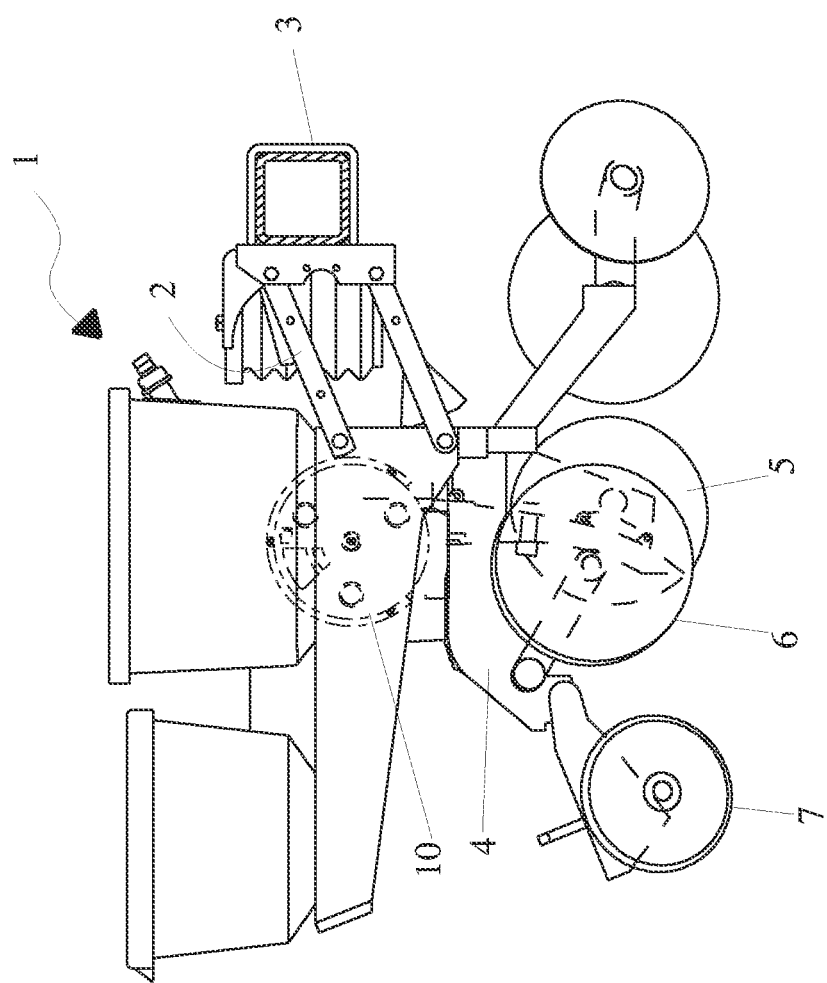

FIG. 1 illustrates a planter row unit 1 with a seed metering device in accordance with the present disclosure. The seed metering device, in accordance with the present disclosure, is generally referenced by the numeral 10. FIG. 1 illustrates a single planter row crop unit of a multi-row planter row unit, with each row crop unit being substantially identical and connected to a common tool bar 3. Only a single row crop unit is shown for the sake of simplicity.

The row crop unit includes a multi-part frame 4 which is attached to the tool bar 3 by parallel linkage 2. The tool bar 3 is coupled to a traction unit (not shown), such as an agricultural tractor. For example, toot bar 3 may be coupled to an agricultural tractor using a 3-point hitch assembly or by appropriate arrangement at the front of an agricultural tractor. Tool bar 3 may be coupled with transport wheel assemblies, marker arms, etc. which may be of conventional design and not shown for simplicity sake. The transport wheels, in known manner, may provide ground drive to row crop unit through the use of shafts, chains, sprockets, transfer cases, etc.

The frame 4 carries a double disc furrow opener 5 for forming a seed trench in soil. A pair of gauge wheels 6 is respectively associated with the pair of discs of double disc furrow opener 5. More particularly, each gauge wheel 6 is positioned generally adjacent to the outside of each respective disc of double disc furrow opener 5. The gauge wheels 6 are pivotally coupled with frame 4 by respective arms. Each gauge wheel 6 may be vertically adjusted to adjust the depth of the trench which is cut into the soil using double disc furrow opener 5. A pair of closing wheels 7 is also carried by frame 4. Closing wheels 7 are positioned generally in line with double disc furrow opener 5. Each row crop unit planter 1 carries a seed metering device 10, schematically indicated in FIG. 1. Although the seed metering device 10 has been described as being associated with the aforementioned planter 1, however, a person skilled in the art will appreciate that the seed metering device 10 can be used by any other associated arrangements.

Figure 2A:
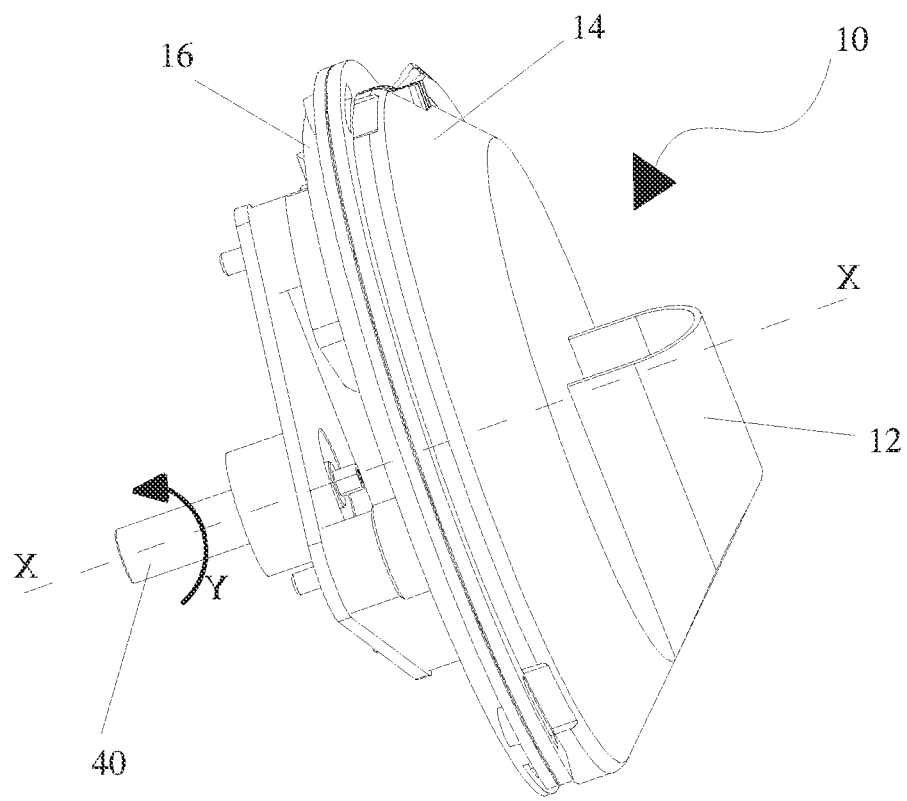
FIG. 2a illustrates a perspective view of the seed metering device in accordance with the present disclosure, indicating the front cover and a rear cover.
Figure 2B:
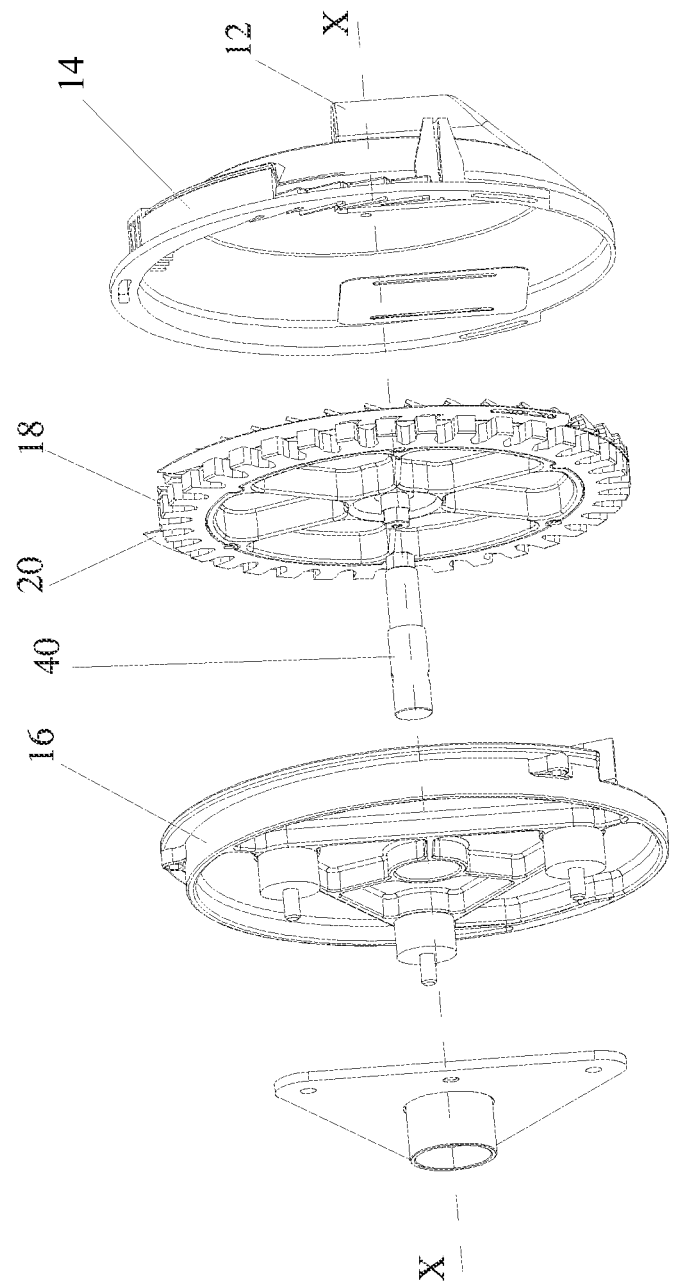
FIG. 2b illustrates an exploded view of the seed metering device in accordance with the present disclosure.
Figure 3:
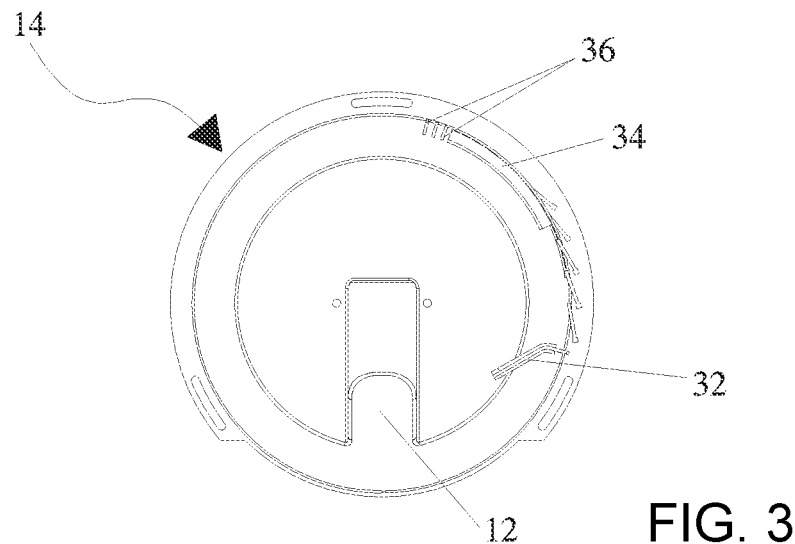
FIG. 3 illustrates the front cover indicated in FIG. 2b with a part of resilient assembly in accordance with the seed metering device of the present disclosure.
Figure 4:
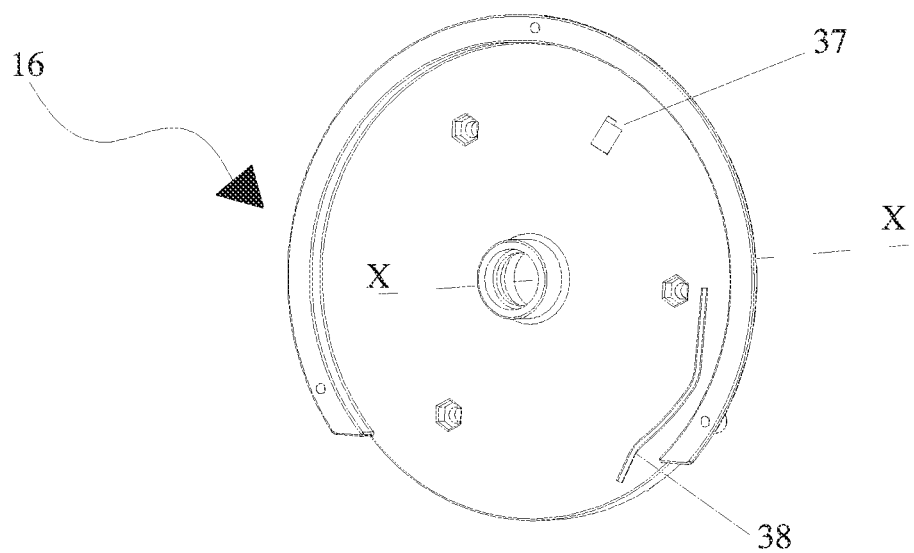
FIG. 4 illustrates the rear cover indicated in FIG. 2b with a part of resilient assembly in accordance with the seed metering device of the present disclosure.

The seed metering device 10, particularly illustrated in FIG. 2a and FIG. 2b, includes an inlet chute 12 which receives seed from a main seed supply, such as a seed hopper. Alternatively, seeds may be stored in a distant main seed hopper and supplied to inlet chute 12 by appropriate arrangement. The seed metering device 10 includes a housing having a front cover 14, illustrated in FIG. 3, and a rear cover 16, illustrated in FIG. 4, defining a space there between. FIG. 3 illustrates the inner side of the front cover 14, illustrated in FIG. 2a while FIG. 4 illustrates inner side of the rear cover 16, illustrated in FIG. 2a. The inlet chute 12 is defined on the front cover 14 provides for a path for the seeds to be received within the space between the front cover 14 and the rear cover 16 and contained at the operative bottom of the seed metering device 10 to form a seed puddle area.

The front cover 14 and the rear cover 16 define a space between the inner surfaces thereof. The space defined between the front cover 14 and the rear cover 16 is partitioned by a seed pick-up disc 18, illustrated in FIG. 5. Further, the seed metering device 10 includes one or more resilient members mounted on the front cover 14 and the rear cover 16 of the housing. The resilient members facilitate retention of the seeds within the seed pick-up portion 26, illustrated in FIG. 6. The resilient members are mounted on the inner surface of the front cover 14 and the rear cover 16 while being functionally associated with the first side 22 and the second side 24, respectively, of the seed pick-up disc 18. The resilient members include a first resilient strip 32, a second resilient strip 34, a third resilient strip 36, displacing guide 37 and a dispensing guide 38, illustrated in FIG. 3 and FIG. 4.

The seed pick-up disc 18 has a first side 22 and a second side 24. The first side 22 of the seed pick-up disc 18 faces the inner surface of the front cover 14 while the second side 24 faces the inner surface of the rear cover 16. The seed pick-up disc 18, along the perimeter, is provided with a plurality of seed holding grooves 25 which are circumferentially spaced apart by a predefined distance.

Figure 6:
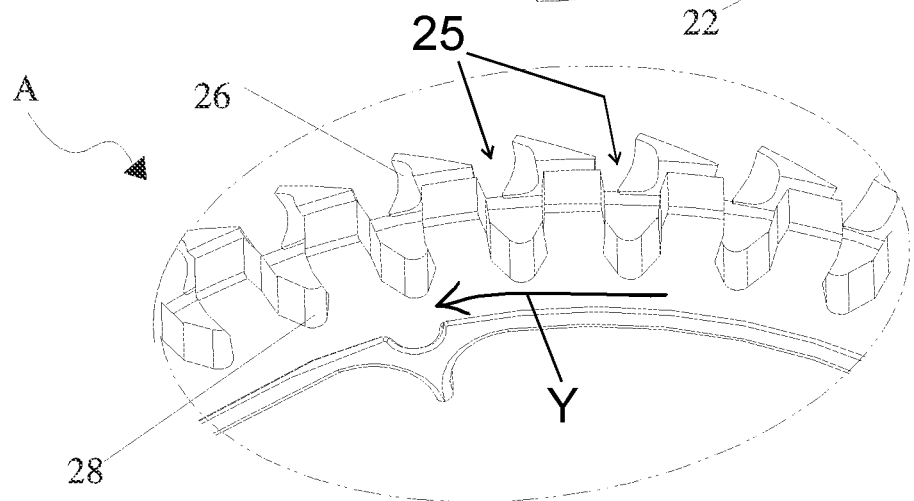
FIG. 6 illustrates enlarged view of the portion A of FIG. 5.

FIG. 6 illustrates an enlarged portion A of the seed pick-up disc 18, indicating the seed holding grooves. Each of seed holding grooves 25 includes a seed pick-up portion 26, proximate the first side 22 and a seed dispensing portion 28, proximate the second side 24. The seed holding grooves 25, illustrated in FIG. 6, are in accordance with one embodiment of the seed holding grooves wherein there is provided a single seed pick-up portion 26 and a single seed dispensing portion 28 corresponding to each seed holding groove 25.

Figure 7:
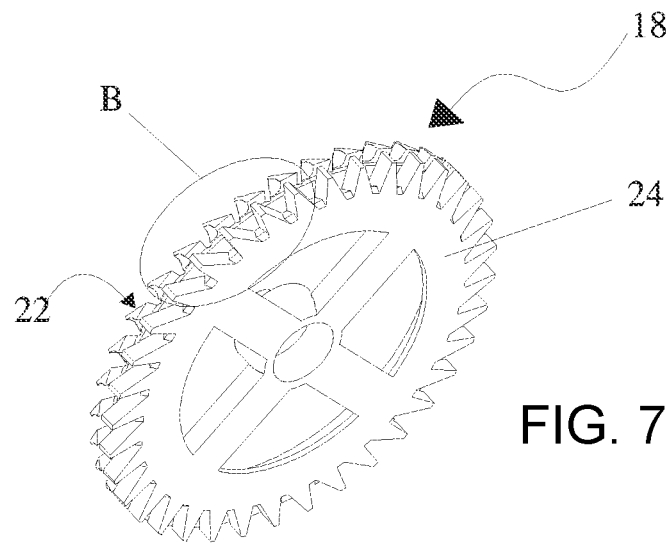
FIG. 7 illustrates a perspective view of another embodiment of the seed pick-up disc, in accordance with the present disclosure.
Figure 8:
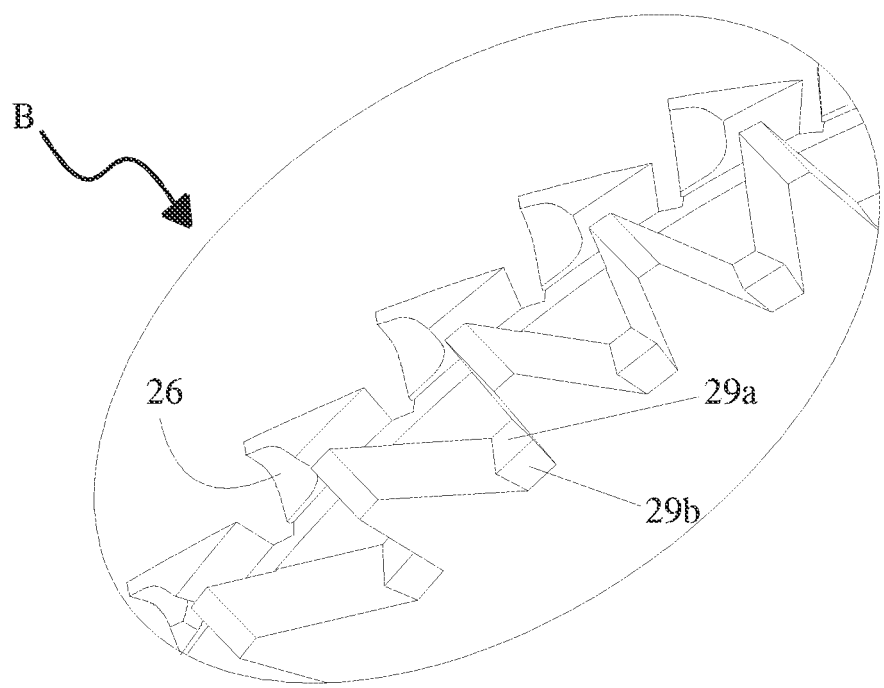
FIG. 8 illustrates enlarged view of the portion B of FIG. 7.

Referring to FIGS. 7 and 8 which illustrate an alternate embodiment of the seed pick-up disc 18 wherein the seed holding grooves is defined by a single seed pick-up portion 26 and a pair of seed dispensing portions, namely, a first seed dispensing section 29a and a second seed dispensing section 29*b*. The operating plane, i.e. the base of each of the seed dispensing portions 29*a* and 29*b* are at an angle to each other. The seed pick-up portions 26 have an arcuate shape to pick up seeds contained within the housing of the seed metering device 10. The seed pick-up disc 18 performs the function of picking the seeds from the seed puddle area and either depositing single seed at regular interval on the ground or returning extra seed into the seed puddle area. The function of picking the seeds from the seed puddle area is carried out by the seed pick-up portion 26 while the function of depositing single seed at regular interval on the ground is carried out by the seed dispensing portion 28 and the seed dispensing portion 29*a*. The function of returning extra seed into the seed puddle area is achieved by the second seed dispensing section 29*b* in the seed metering device 10 using the alternate embodiment of the seed pick-up disc 18, illustrated in FIGS. 7 and 8.

Figure 11:
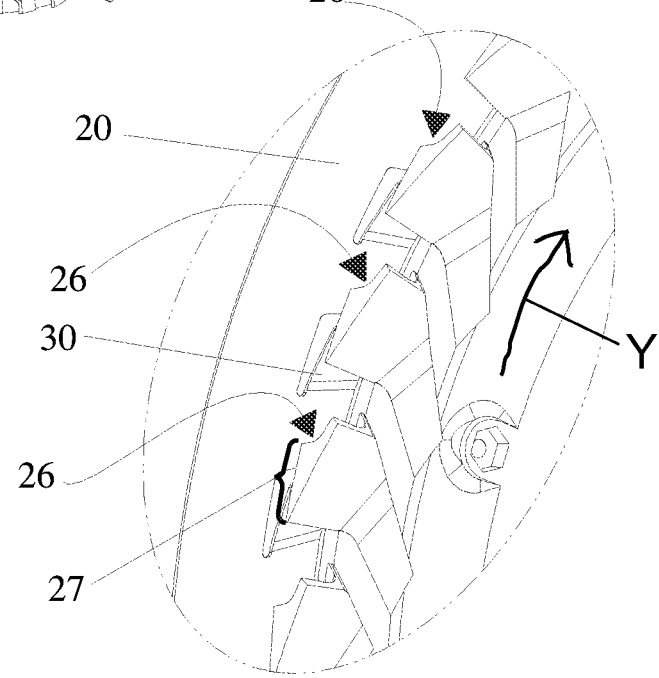
FIG. 11 illustrates enlarged view of the portion C of FIG. 10.

The seed pick-up disc 18 rotates about the central axis X-X in the direction indicated by the arrow Y, illustrated in FIGS. 2, 6 and 11 within the space between the inner side of the front cover 14 and the rear cover 16. The seed pick-up disc 18 is rotated by the shaft 40 powered by a motor or a chain and sprocket arrangement (not shown in Figure). On rotation of the seed pick-up disc 18, the seed pick-up portions 26 picks up seeds while passing through the seed puddle area in the housing. The seed pick-up portions 26 may pick up one or more seeds to displace the seeds from the seed puddle area while the seed pick-up disc 18 rotates about the central axis X-X. The first resilient strip 32, indicated in FIG. 3, is mounted on the inner surface of the front cover 14 and guides the seeds from the seed puddle area into the seed pick-up portion 26 during rotation of the seed pick-up disc 18 about the axis X-X. The first resilient strip 32 functionally contacts the first side 22 of the seed pick-up disc 18 along an operating plane having a predetermined first angle to the first side 22. The first resilient strip 32 ensures one or more seed is accommodated within each of the seed pick-up portions 26. Further, due to the resilient nature of the first resilient strip 32, the seeds are not damaged by being positioned between the first side 22 and the first resilient strip 32.

Figure 5:
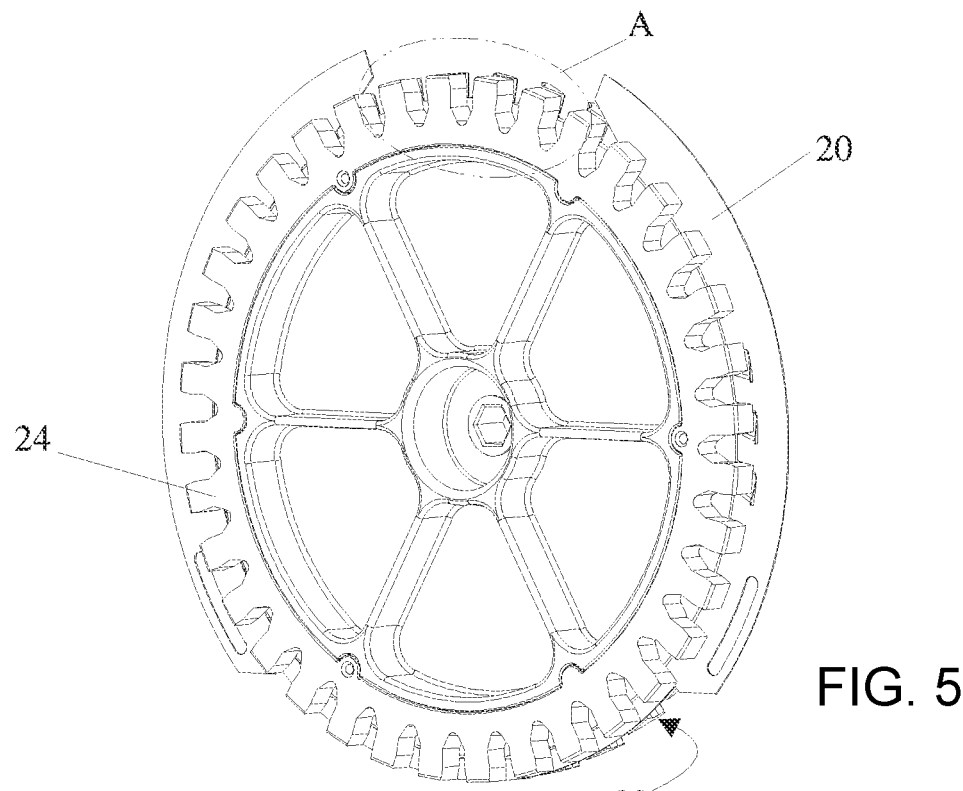
FIG. 5 illustrates a rear perspective view of an embodiment of a seed pick-up disc with a singulating member, in accordance with the present disclosure.
Figure 9:
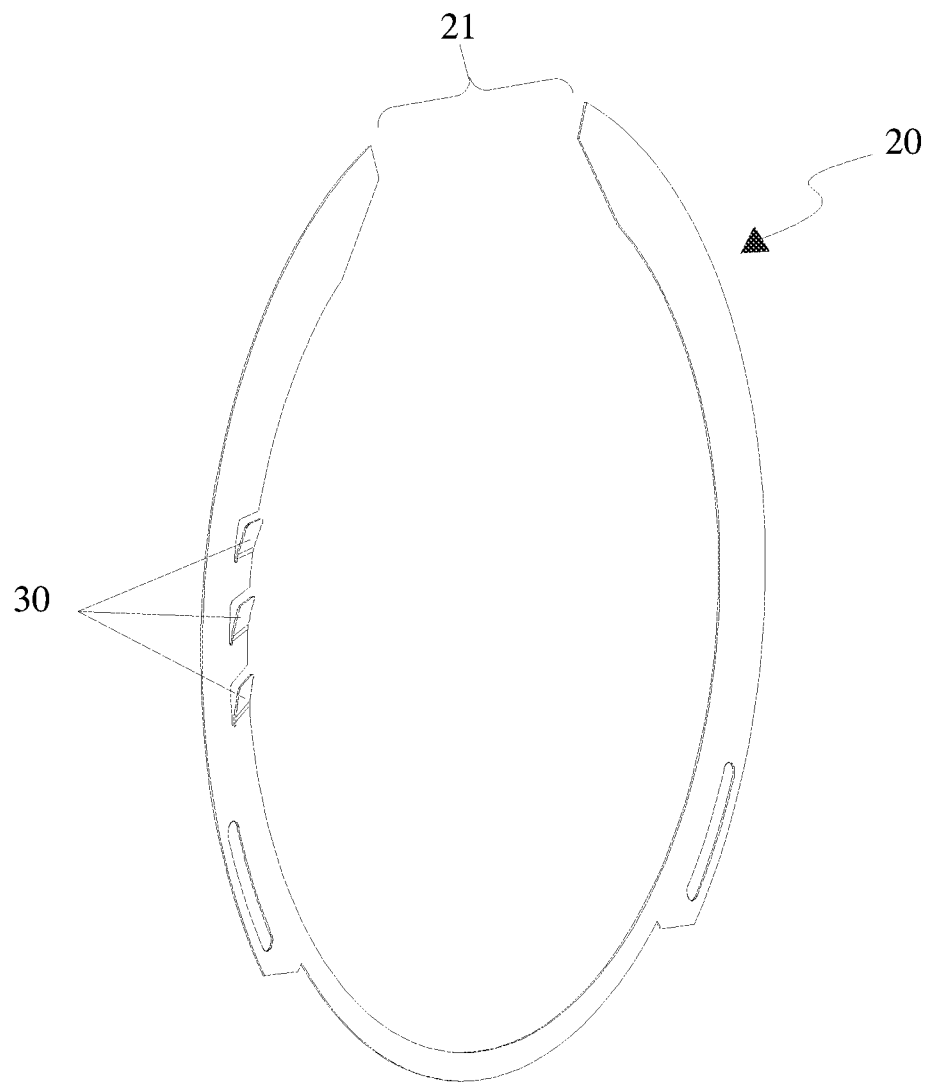
FIG. 9 illustrates the singulating member, in accordance with the present disclosure.
Figure 10:
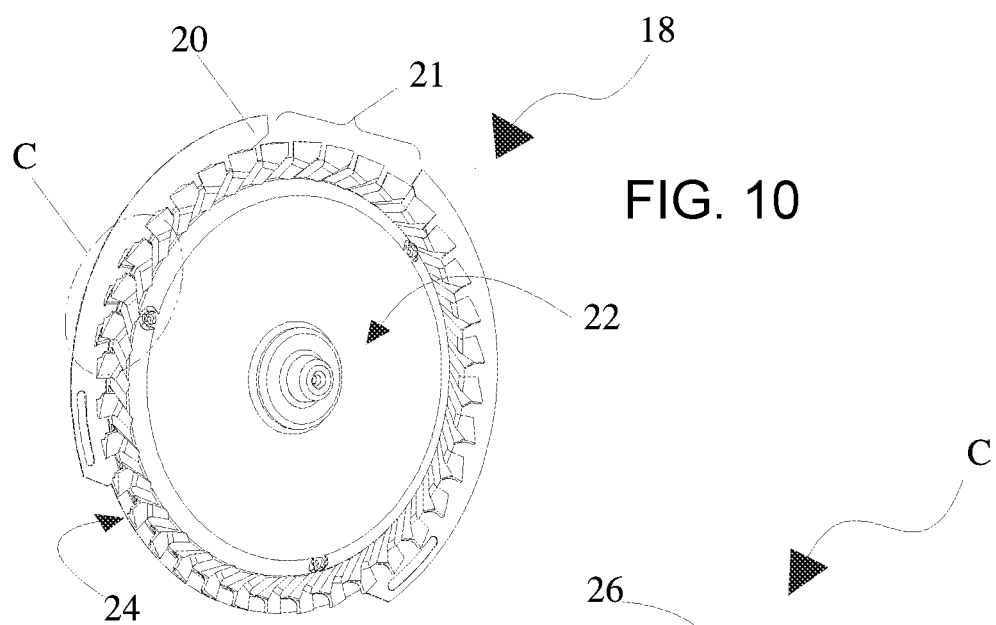
FIG. 10 illustrates a front perspective view of a seed pick-up disc, illustrated in FIG. 5, along with the singulating member.

In order to ensure that only one seed is disposed on the ground at regular interval, a seed singulating member 20, particularly illustrated in FIG. 9, is associated with the seed pick-up disc 18. Referring to FIG. 5, the seed pick-up disc 18 is illustrated along with the seed singulating member 20. The seed singulating member 20 acts as to partition between the seed pick-up portion 26 and the seed dispensing portion 28, except along a gap 21, indicated in FIG. 10, provided in the seed singulating member 20. The seed singulating member 20 is mounted on the housing in a stationary configuration with respect to the seed pick-up disc 18. Further, the seed singulating member 20 has one or more seed eliminating strips 30, particularly indicted in FIG. 9, extending from at least a portion of the singulating member 20. The seed singulating member 20 is shown with a plurality of seed eliminating strips 30 extending therefrom.

Referring to FIG. 10 and FIG. 11, each of the seed eliminating strips 30 are shaped so as to be sequentially associated with each of the seed pick-up portions 26 as the seed pick-up portions move past the seed eliminating strips 30 during rotation of the seed pick-up disc 18 about the axis X-X. In the operative configuration, the seed eliminating strips 30 projects into the seed pick-up portion 26 in a way to occupy a predefined space of the seed pick-up portion 26. This results in retaining a single seed within the seed pick-up portion 26 while eliminating multiple or excess seeds from the seed pick-up portions 26. The second resilient strip 34, indicated in FIG. 3, is mounted on the inner surface of the front cover 14 and is located after the position of the seed eliminating strips 30 to hold the seed picked up by the seed pick-up portion 26. The second resilient strip 34 has a profile which is an arcuate shape or a linear shape. The second resilient strip 34 functionally contacts the first side 22 of the seed pick-up disc 18 along an operating plane having a second predetermined angle to the first side 22. The first predetermined angle and the second predetermined angle are either equal or variable.

Each of the seed pick-up portions 26, containing the singulated seeds move to the gap portion 21 of the seed singulating member 20, with the rotation of the seed pick-up disc 18 about the axis X-X in the direction Y, indicated in FIG. 2. The third resilient strip 36, indicated in FIG. 3, is mounted on the inner surface of the front cover 14 and is located after the positioning of the second resilient strip 34 to displace the singulated seed from the seed pick-up portion 26, through the gap 21 in the singulating member 20, to the seed dispensing portion 28, in the embodiment of the seed pick-up disc 18, illustrated in FIG. 5, and either the first seed dispensing section 29*a* or the second seed dispensing section 29*b*, in the embodiment of the seed pick-up disc 18, illustrated in FIG. 7. The third resilient strip 36 functionally contacts the first side 22 of the seed pick-up disc 18 along an operating plane, substantially perpendicular to the plane of the first side 22 of the seed pick-up disc 18, so as to project into each of the seed pick-up portions 26 crossing the second resilient strip 34. The third resilient strip 36 includes a single strip or a plurality of resilient strips. Three such strips are shown in FIG. 3. When the third resilient strip 36 projects into each of the seed pick-up disc 18, it pushes the singulated seeds in each of the seed pick-up portion 26 into the seed dispensing portion 28, in the embodiment of the seed pick-up disc 18, illustrated in FIG. 5, or the first seed dispensing section 29*a* and the second seed dispensing section 29*b*, in the embodiment of the seed pick-up disc 18, illustrated in FIG. 7.

Referring to the embodiment of the seed pick-up disc 18, illustrated in FIG. 5 and FIG. 6, each of the singulated seed, received into the seed dispensing portion 28 from the seed pick-up portion 26, is displaced along with the rotation of the seed pick-up disc 18. The seed dispensing portion 28 functionally communicates with the seed dispensing opening (not particularly shown in the Figures). The rear cover 16, when used with the seed pick-up disc 18, illustrated in FIG. 5, does not include the displacing guide 37. The singulated seeds from each of the seed dispensing portions 28 are guided by the dispensing guide 38 between the seed dispensing portions 28 of the seed pick-up disc 18 and the rear cover 16 to be dropped to the ground to be sowed.

Referring to the embodiment of the seed pick-up disc 18, illustrated in FIG. 7 and FIG. 8, each of the singulated seed from the seed pick-up portion 26 is received into either the first seed dispensing section 29*a* or the second seed dispensing section 29*b*. The first seed dispensing section 29*a* is profiled to receive the singulated seeds from the seed pick-up portion 26 as well as the second seed dispensing section 29*b*. However, the shape of the first seed dispensing section 29*a* prevents the singulated seed received from the seed pick-up portion 26 to be displaced to the second seed dispensing section 29*b*. The singulated seed received in either of the first seed dispensing section 29*a* or the second seed dispensing section 29*b* is displaced along with the rotation of the seed pick-up disc 18. The first seed dispensing section 29*a* functionally communicates with the seed dispensing opening while the second seed dispensing section 29b functionally communicates with the seed puddle area. When the seed pick-up disc 18, illustrated in FIG. 7, is utilized, the rear cover 16 as illustrated in FIG. 4 is used, wherein the rear cover 16 is provided with a displacing guide (not shown in Figure) which is positioned at an angle to the seed pick-up disc 18. The displacing guide is mounted on the rear cover 16 and functionally contacts the second side 24 of the seed pick-up disc 18 along an operating plane at a predetermined angle to the plane of the second side 24 of the seed pick-up disc 18, so as to glidingly moved over the second seed dispensing section 29b so as to project into each of the second seed dispensing sections 29b. When the displacing guide projects into each of the seed pick-up disc 18, it pushes the singulated seeds in each of the second seed dispensing section 29b towards the first seed dispensing section 29a.

In normal operation of the third resilient strip 36, the singulated seed is pushed into the first seed dispensing section 29a. The singulated seeds from each of the first seed dispensing section 29a are guided by the dispensing guide 38 to be dropped to the ground to be sowed.

In the case wherein the singulated seed is pushed into the second seed dispensing section 29b, the displacing guide 37 tends to push the seed into the first seed dispensing section 29a. When a seed is not present in the first seed dispensing section 29a, the singulated seed from the second seed dispensing section 29b is pushed into the first seed dispensing section 29a. The singulated seeds from each of the first seed dispensing section 29a are dropped to the ground to be sown. However, in cases of an unlikely event, wherein a singulated seed is already present in the first seed dispensing section 29a and another seed is also present in the second seed dispensing section 29b, the displacing guide 37 tends to push the seed into the first seed dispensing section 29a. However, due to the presence of the singulated seed in the first seed dispensing section 29a and the force of gravity, the seed in the second seed dispensing section 29b is forced to move into an adjacent second seed dispensing section 29b, which already crosses the dispensing guide 38. The singulated seed from the first seed dispensing section 29a is dropped to the ground for sowing, while the singulated seed from the second seed dispensing section 29b is dropped back to the seed puddle area.

The housing and the seed pick-up disc 18 are made of a polymeric material, a metal or a combination thereof. Also, the first resilient strip 32, the second resilient strip 34, the third resilient strip 36, the displacing guide 37 and the dispensing guide 38 are made of a plurality of bristles or a flexible material.

Thus, the seed metering device 10 enables accurately sowing seeds at regular interval.

While the foregoing specification has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure which comes within known or customary practice in the art to which this invention pertains.

We claim:
1. A seed metering device comprising:
   a housing having a front cover and a rear cover, said housing defining an enclosed space therein forming a seed puddle area to contain seeds therein and a seed dispensing opening to dispense seeds from said housing;
   a seed pick-up disc disposed within said housing, partitioning said enclosed space into a seed inlet and a seed outlet, said seed pick-up disc having a plurality of seed holding grooves, circumferentially spaced apart by a predefined distance, each of said seed holding grooves defines a seed pick-up portion, proximate said front cover, and at least one seed dispensing portion, proximate said rear cover;
   a seed singulating member having at least one seed eliminating member associated with said seed pick-up disc for facilitating removal of excess seeds from said seed pick-up portion and
   at least one resilient member mounted on said housing, said at least one resilient member guiding seeds relative to said seed holding grooves wherein said at least one resilient member includes a second resilient strip to hold the seed picked up by said seed holding grooves therein.

2. The seed metering device as claimed in claim 1, wherein each of said seed dispensing portions is shaped to define a first seed dispensing section and a second seed dispensing section, said first seed dispensing section being defined between said seed pick-up portion and said second seed dispensing section.

3. The seed metering device as claimed in claim 1, wherein said singulating member separates said seed pick-up portion and said seed dispensing portion about at least a portion of said seed pick-up disc.

4. The seed metering device as claimed in claim 1 wherein the seed pick-up portion has an arcuate shape to pick up seeds contained within the housing seed puddle area.

5. The seed metering device as claimed in claim 1, wherein said at least one seed eliminating member projects into said seed pick-up portion of said seed holding grooves, each of said at least one seed eliminating member facilitating removal of excess seeds within each of said seed pick-up portions.

6. The seed metering device as claimed in claim 1, wherein said at least one resilient member includes a first resilient strip to facilitate the seeds to be guided into said seed holding grooves from said seed puddle area.

7. The seed metering device as claimed in claim 1, wherein said at least one resilient member includes a third resilient strip to guide seed from said seed pick-up portion to said seed dispensing portion, said third resilient strip lying in a plane substantially perpendicular to a plane of said seed pick-up disc.

8. The seed metering device as claimed in claim 1, wherein said at least one resilient member includes a dispensing guide to urge seed from the seed dispensing portion to be dropped to the ground.

9. The seed metering device as claimed in claim 2, wherein said at least one resilient member includes a displacing guide to urge seed in the second dispensing section toward said first dispensing section.

10. The seed metering device as claimed in claim 2, wherein said first seed dispensing section communicates with said seed dispensing opening and said second seed dispensing section communicates said seed puddle area.

11. The seed metering device as claimed in claim 2, wherein at least a portion of said rear side of said housing is shaped to enable conveying a seed from said second seed dispensing section to said seed puddle area.

12. The seed metering device as claimed in claim 1, wherein said housing and said seed pick-up disc are made of material selected from the group consisting a metal and a polymeric material.

13. The seed metering device as claimed in claim 1, wherein said at least one resilient member is made of at least one of a plurality of bristles and a flexible material.

14. A seed metering device comprising:
- a housing having a front cover and a rear cover, said housing defining an enclosed space therein forming a seed puddle area to contain seeds therein and a seed dispensing opening to dispense seeds from said housing;
- a seed pick-up disc disposed within said housing, partitioning said enclosed space into a seed inlet and a seed outlet, said seed pick-up disc having a plurality of seed holding grooves, circumferentially spaced apart by a predefined distance, each of said seed holding grooves defines a seed pick-up portion, proximate said front cover, and at least one seed dispensing portion, proximate said rear cover;
- a seed singulating member having at least one seed eliminating member associated with said seed pick-up disc for facilitating removal of excess seeds from said seed pick-up portion; and
- at least one resilient member mounted on said housing, said at least one resilient member guiding seeds relative to said seed holding grooves wherein said at least one resilient member includes a first resilient strip to facilitate the seeds to be guided into said seed holding grooves from said seed puddle area, a second resilient strip to hold the seed picked up by said seed holding grooves, and a third resilient strip to guide seed from said seed pick-up portion to said seed dispensing portion.

15. The seed metering device as claimed in claim 14, wherein said at least one resilient member further includes a displacing guide to urge seed in the second dispensing section toward said first dispensing section.

16. The seed metering device as claimed in claim 14, wherein said first resilient strip, said second resilient strip, and said third resilient strip are made of at least one of a plurality of bristles and a flexible material.

* * * * *